United States Patent
Hente et al.

(10) Patent No.: US 8,063,579 B2
(45) Date of Patent: Nov. 22, 2011

(54) CIRCUIT-ARRANGEMENT FOR MODULATING AN LED AND METHOD FOR OPERATING SAME

(75) Inventors: Dirk Hente, Wurselen (DE); Georg Sauerlander, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 578 days.

(21) Appl. No.: 12/097,059

(22) PCT Filed: Dec. 4, 2006

(86) PCT No.: PCT/IB2006/054581
§ 371 (c)(1),
(2), (4) Date: Jun. 12, 2008

(87) PCT Pub. No.: WO2007/069124
PCT Pub. Date: Jun. 21, 2007

(65) Prior Publication Data
US 2008/0265795 A1    Oct. 30, 2008

(30) Foreign Application Priority Data

Dec. 14, 2005   (EP) ................................... 05112107

(51) Int. Cl.
*H05B 37/02*   (2006.01)

(52) U.S. Cl. .................................... 315/291; 315/209 R

(58) Field of Classification Search ............. 315/209 R, 315/224, 225, 291, 307
See application file for complete search history.

(56) References Cited

U.S. PATENT DOCUMENTS

| | | | | |
|---|---|---|---|---|
| 4,365,281 | A * | 12/1982 | Baker | 361/91.4 |
| 5,852,550 | A * | 12/1998 | Majid et al. | 363/21.05 |
| 5,959,413 | A * | 9/1999 | Komarek et al. | 315/306 |
| 6,043,501 | A * | 3/2000 | Franckart et al. | 250/551 |
| 6,323,631 | B1 | 11/2001 | Juang | |
| 7,038,393 | B2 * | 5/2006 | Murakata et al. | 315/169.3 |
| 7,215,086 | B2 * | 5/2007 | Maxik | 315/247 |
| 2005/0127883 | A1 * | 6/2005 | Hoshino et al. | 323/274 |

FOREIGN PATENT DOCUMENTS

| | | |
|---|---|---|
| DE | 19841490 B4 | 6/2005 |
| EP | 0562684 A1 | 9/1993 |
| GB | 2162399 A | 1/1986 |
| GB | 2392023 A | 2/2004 |
| WO | WO03024159 A2 | 3/2003 |
| WO | WO2004100612 A1 | 11/2004 |
| WO | WO 2004100612 A1 * | 11/2004 |

* cited by examiner

*Primary Examiner* — Jacob Y Choi
*Assistant Examiner* — Jimmy Vu

(57) ABSTRACT

To achieve high modulation frequencies when modulating an LED, a circuit-arrangement for modulating at least one LED comprises a modulation-circuit (3) parallel to the LED, wherein the modulation-circuit (3) comprises in a series connection a switching device and a threshold device. In a method for operating an LED, the LED is modulated by alternating the switching device between a closed state and an open state.

14 Claims, 4 Drawing Sheets

CIRCUIT-ARRANGEMENT FOR MODULATING AN LED AND METHOD FOR OPERATING SAME

FIELD OF THE INVENTION

The present invention relates to a circuit-arrangement for modulating an LED, a system for modulating a plurality of LEDs and a method for operating an LED.

LEDs are used today in many applications, due to their low power consumption and long lifetime. Accordingly, several types of driver-circuits are available to operate such an LED.

BACKGROUND OF THE INVENTION

For some applications, it is necessary to enable a modulation of the LED. A solution to this problem is shown in the prior art. U.S. Pat. No. 5,959,413 discloses in FIG. 8 a series arrangement of three LEDs, driven by a single current source 192. Switches 186, 188, 190 are arranged parallel to the respective LED, which enable an alternate current path, so that the respective LED can be short-circuited and thus can be switched off and on.

Although the shown approach ensures a constant current through each LED, a disadvantage of this circuit is that a high frequency modulation of the LEDs may cause problems with current spikes. Further, when a switch across the respective LED is closed, the intrinsic capacitance of the LED is short circuited. Upon opening of the switch, the intrinsic capacitance is charged again, before the LED is illuminated. Therefore, it may be difficult to achieve high modulation frequencies.

SUMMARY OF THE INVENTION

It is an object of this invention to provide a circuit-arrangement, which enables good modulation properties.

The object is solved according to the invention by a circuit-arrangement, a system for high-frequency modulating a plurality of LEDs, and a method for operating an LED.

The circuit-arrangement according to the invention comprises a modulation-circuit parallel to at least one LED. Within the modulation-circuit, a switching device and a threshold device are arranged in series. The modulation-circuit serves as an alternate current path to a current, applied in forward direction of the LED at the parallel connection of the LED and the modulation-circuit. The switching device enables at least a closed state and an open state of the modulation-circuit, so that the LED is not essentially illuminated, when the switch is closed. The switching device therefore serves as means to toggle the illumination-state of the LED. Nevertheless it is not necessary, that the switching device has a resistance of nearly 0 Ohm, which corresponds to a 'full' closed state. Further, even in the closed state it is not necessary that the supplied current is completely fed through the modulation-circuit. When the switching device is in the closed state, the forward bias voltage of the LED is reduced to a level, where the LED is not essentially illuminated, whereby the term 'not essentially illuminated' is in the present context understood to include brightness levels invisible to the human eye under the given environment conditions. The switching device may be any type of electrical device, providing at least an open state and a close state, for example a simple switch, a relay or preferably a semiconductor switching component.

The threshold device serves in the modulation-circuit to limit the diode voltage $U_d$, applied across the LED, to a predetermined threshold voltage level $U_z$, when the switching device is in the closed state. Due to this, the intrinsic capacitance of the LED is not completely discharged in this state. When the switching device is set to the open state again, the intrinsic capacitance is still at least partly charged, so that the charging and response time of the LED is advantageously shortened. The threshold device may be any type of electric or electronic component, which is conductive, when the voltage applied to it is equal to or exceeds a predefined operating point and is substantially non-conductive, when the voltage is below the operating point. For example, the threshold device may be a bipolar transistor, field effect transistor or a zener diode (z-diode).

The arrangement according to the invention does not only enable high frequency modulation. As a further advantage, a short but large current pulse is eliminated, which is generated when the intrinsic capacitance of the LED is discharged, resulting in reduced switching losses and an enhanced level of electromagnetic compatibility. The circuit-arrangement of the invention is therefore well-suited for EMI (electromagnetic interference) sensitive applications like aerospace and automotive. Due to the enabled high modulation rates, an application in the field of telecom, for example in a transceiver, is possible. It is further possible to use the circuit-arrangement according to the invention in lighting applications to dim an LED by modulation. Here, a high modulation rate in the range of several 10 kHz is necessary to realize smooth transition effects.

The predetermined threshold voltage $U_z$ should be generally chosen in dependence of the characteristics of the utilized devices, so that in a closed state of the switching device the intrinsic capacitance of the LED is not discharged completely, while at the same time the LED is not essentially illuminated.

The LED may be of any type, as desired by the application. Generally, the LED and the devices of the modulation-circuit should be chosen, so that the combined internal capacitance of the devices of the modulation-circuit is smaller than the intrinsic capacitance of the LED. Additional LEDs may be connected in series or parallel to the LED. In this case, the forward bias is the overall combined forward bias of the LEDs and the intrinsic capacitance is the overall combined intrinsic capacitance of the LEDs.

In a preferred embodiment, the LED is an organic light-emitting device (OLED). OLEDs are recently be used for display and general lighting applications. Due to its layered structure and plate-capacitor-like setup, an OLED typically exhibit a large capacitance of 100-500 $pF/mm^2$ for a typical layer thickness of approx. 500 nm between the electrodes. Because of the high capacitance, the invention is especially advantageous here.

In a further preferred embodiment, the threshold device is a zener diode. Zener diodes are commercially available electronic components, which can be applied to stabilize the voltage across the LED. It is especially preferred, that the zener diode is arranged in a forward bias orientation in opposite direction to the forward bias orientation of the LED. In this configuration, the zener diode is conductive, if a voltage, greater than the zener voltage $U_z$ is applied. If the voltage falls below $U_z$, the zener diode is not conductive.

In the present embodiment, the zener diode is used in the closed state of the switching device. In this case, when a current is applied to the circuit-arrangement in forward direction of the LED, the zener diode stabilizes the diode voltage $U_d$ to $U_z$. Thereby, the zener diode prevents a complete discharge of the intrinsic capacitance of the LED.

It is preferred that the threshold voltage $U_z$ of the threshold device is chosen between 0.1 and $1.5 \times U_f$, where $U_f$ is the forward bias voltage of the LED. In the case where more than one LED is used in series in the circuit-arrangement, $U_f$ is the combined forward voltage of the LEDs. Experimental results have shown, that this range results in significant higher modulation rates. However, it is to be noted, that because of the dependence of $U_f$ on operational parameters, this may not be the case when extreme operating conditions or aged LEDs are used. In this case, $U_z$ may be chosen considering these effects for the specific LED used. It is further preferred, that $U_z$ is between $0.9 \times U_f$ and $1.2 \times U_f$, whereby it is especially preferred that $U_z$ is less than $U_f$.

According to a development of the invention, the switching device is a driven switching component and preferably a semiconductor switching component. Typical examples of such semiconductor switching components are transistors, especially BJTs, FETs, Thyristors or the like. The switching device should enable a high switching cycle and a suitable lifetime, even under high currents, which may be the case when a plurality of LEDs is used in parallel connection in the circuit-arrangement. To obtain high modulation rates, the switching device should generally exhibit a low internal capacitance.

In a system for modulating a plurality of LEDs independently, a plurality of circuit-arrangements according to the invention are connected in series to a single current source. When multiple LEDs are used in a single device, it is desirable to keep currents low. Thus, a series approach is preferred to reduce power losses through parasitic resistances.

Such a setup may be particularly advantageous if it is desired, that the brightness of each of several LEDs be equal to each other, for example in applications where color mixing is required, e.g. with three LEDs for red, green and blue, respectively. Further, the series connection of a plurality of circuit-arrangements including an LED enables an independent modulation control of each LED. As mentioned before, each LED in a circuit-arrangement may also be accompanied by additional LEDs to form a group, for example to enhance the brightness of each independent group. It is also possible to arrange a plurality of circuit-arrangements in a three-dimensional lattice structure LED array according to U.S. Pat. Nos. 6,249,088 or 6,201,353.

These and other aspects of the invention will be apparent from and elucidated with reference to the embodiments described hereinafter.

BRIEF DESCRIPTION OF THE DRAWINGS

In the figures.

DETAILED DESCRIPTION OF EMBODIMENTS

Figure 1:
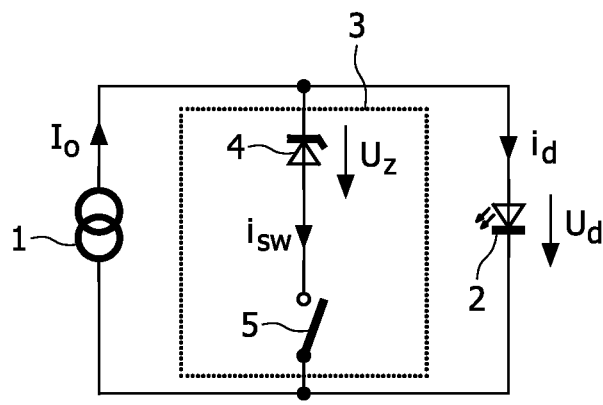
FIG. 1 shows a circuit diagram of an embodiment of a circuit-arrangement according to the invention.

FIG. 1 shows a circuit diagram of an embodiment of a circuit-arrangement according to the invention. Here, a current source 1 supplies a current $I_0=5$ A to a parallel connection of an OLED 2 and a modulation-circuit 3, which comprises a zener diode 4 and a switch 5. The switch 5 serves as a switching device and enables at least an open state and a closed state. In the closed state, the modulation-circuit 3 short-circuits the OLED 2, so that the OLED 2 is not illuminated. For modulation of the OLED 2 in terms of dimming, the switch 5 is periodically alternated between the open and the closed state. The zener diode 4 is arranged in reverse bias direction to the forward direction of the OLED 2 and exhibits a zener voltage $U_z=5V$ with a corresponding zener current of 1 A.

When the current $I_0$ is applied to the circuit-arrangement and the switch 5 is in the open state, as shown, the current charges the intrinsic capacitance C of the OLED 2. When the intrinsic capacitance C is fully charged and thus the voltage applied at the OLED 2 reaches the forward bias voltage $U_f$, the OLED 2 is illuminated.

Figure 2:
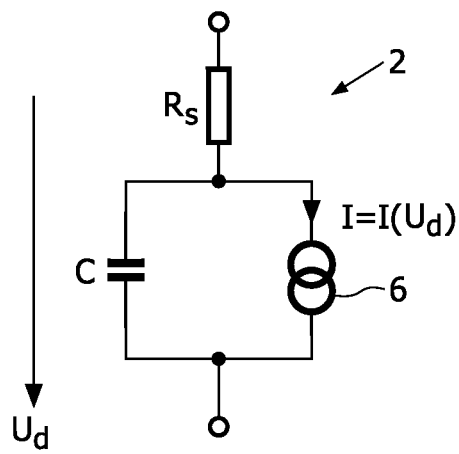
FIG. 2 shows an equivalent network of an exemplary OLED, used in the embodiment of FIG. 1.
Figure 3:
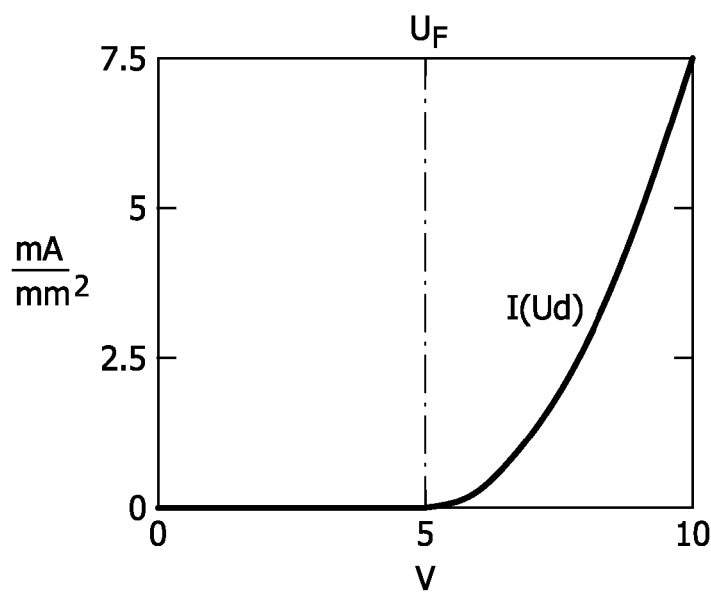
FIG. 3 shows a voltage/current diagram of the exemplary OLED, used in the embodiment of FIG. 1.
Figure 4A:
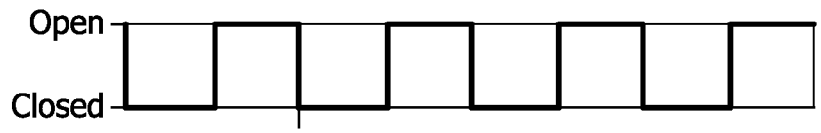
FIG. 4a shows a graph of the state of the switch over time in the embodiment of FIG. 1.
Figure 4B:
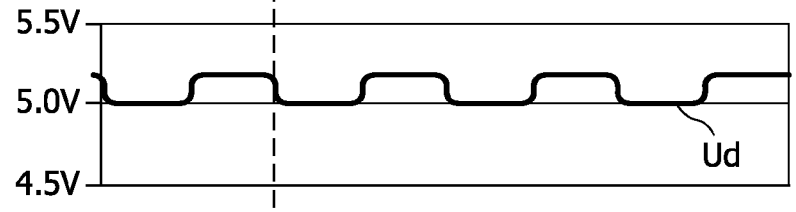
FIG. 4b shows a graph of the diode voltage $U_d$ over time in the embodiment of FIG. 1.
Figure 4C:
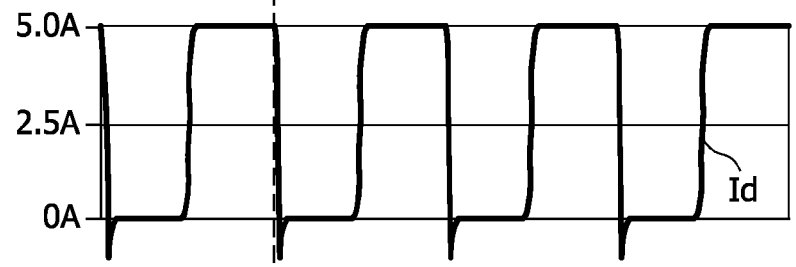
FIG. 4c shows a graph of the diode current $I_d$ over time in the embodiment of FIG. 1.
Figure 4D:
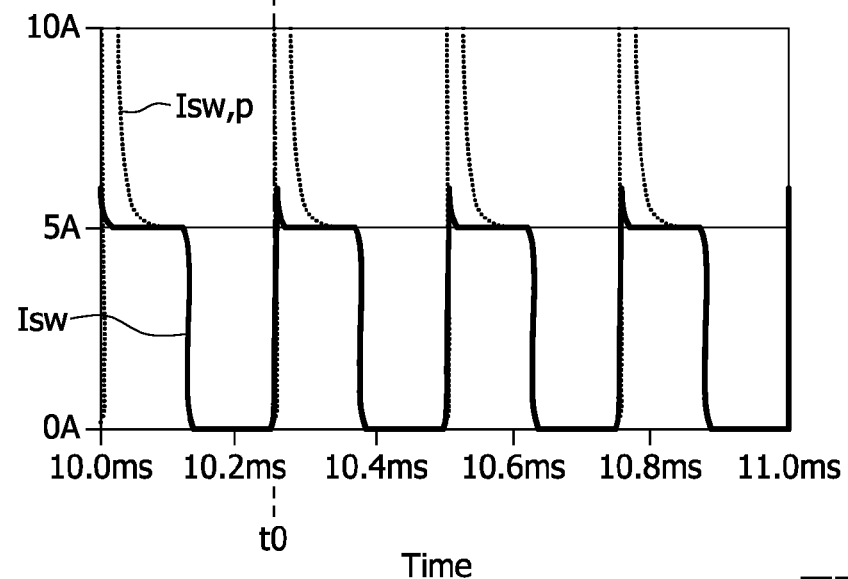
FIG. 4d shows a graph of the switch current $I_{sw}$ over time in the embodiment of FIG. 1.

An equivalent network of the exemplary OLED 2 is shown in FIG. 2. Here, the intrinsic capacitance C is connected parallel to an equivalent current source 6, which provides a current $I=I(U_d)$. A resistor $R_s$ is provided in series to the capacitance C and the current source 6 and represents the internal resistance of the OLED 2. The current flow through the OLED 2 is determined by the following equation:

$$I(U_d) = \text{gain}^* (U - U_f)^2,$$

where gain denotes the gain factor per m² and $U_f$ is the forward bias voltage of the OLED. The OLED 2 used here shows a gain value of gain=0.3 mA/mm²/V² and a forward bias voltage of $U_f=5V$. The voltage/current diagram for this exemplary OLED 2 is shown in FIG. 3. For an OLED with a size of 0.5 m², the resulting drive current is I=5 A. With a typical specific device capacitance of 200 pF/mm², the capacitance C results to C=100 μF As mentioned before, the switch 5 is periodically switched on and off to dim the OLED 2. To reduce flicker, the frequency is chosen to 10 kHz. FIG. 4a-4d depict the state of the switch 5, the diode voltage $U_d$, diode current $I_d$ and switch current $I_{sw}$, respectively, for some switch cycles of the switch 5. When the switch 5 is brought to the closed state at a given time t0, the diode voltage $U_d$ is above $U_z$ and thus, the zener diode 4 is conductive in the reverse bias direction. Accordingly, due to the flow of the switch current $I_{sw}$, the diode voltage $U_d$ decreases and the zener diode 4 limits the voltage to a predefined operating point, which is $U_z$ (=5V) in the case that an ideal switch 5 is used, otherwise, the diode voltage $U_d$ is limited to $U_z + U_{sw}$, whereby $U_{sw}$ is the potential difference across the switch 5.

$U_d$ is stabilized so that the intrinsic capacitance C of the OLED 2 remains partly charged, although the OLED 2 is not illuminated ($U_D \leq U_F$). Further, the switch current $I_{sw}$ is limited to a predefined level and large current-spikes, which would be caused by a full discharge of the intrinsic capacitance of the OLED 2 are avoided, which can exceed some 10 A in circuit-arrangements of the prior-art, as can be seen from the dotted curve $I_{sw,p}$ in FIG. 4c. In comparison thereto, the curve $I_{sw}$ only shows a small discharge current-spike, which is lower than 1 A.

Figure 5:
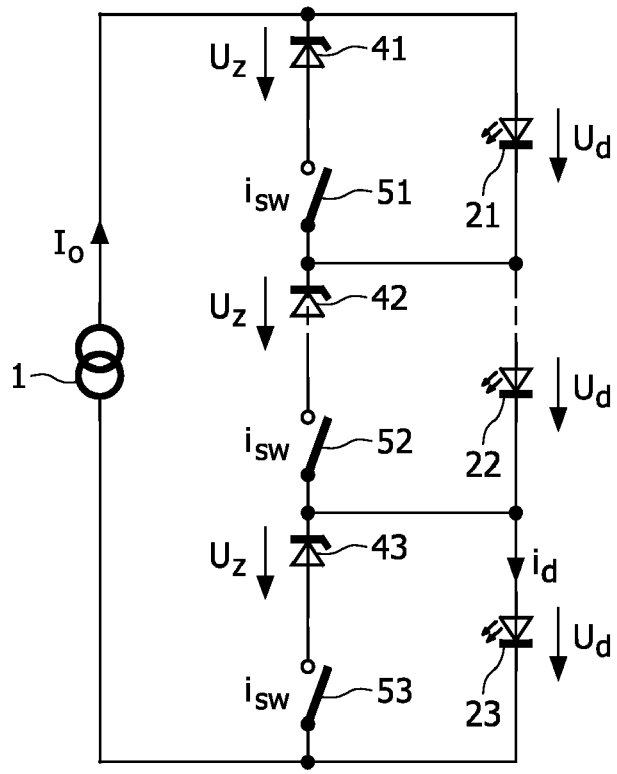
FIG. 5 shows a circuit diagram of an example of a system for modulating a plurality of OLEDs.

FIG. 5 shows an example of a system for modulating a plurality of OLEDs 21, 22, 23, using a series connection of three circuit-arrangements according to the embodiment, shown in FIG. 1. The system is driven by the current $I_0$, which is substantially constant in each OLED 21, 22, 23, resulting in a constant brightness of each OLED 21, 22, 23. Here, the OLEDs 21, 22, 23 emit red, blue and green light, respectively, which enables RGB color-mixing. Because of the color-mixing, a constant brightness of each OLED 21, 22, 23 is advantageous. Parallel to each OLED 21, 22, 23, switches 51, 52, 53 are arranged for dimming each OLED 21, 22, 23, respectively, and form an alternative current path to each OLED 21, 22, 23. Zener diodes 41, 42, 43 are arranged in the alternative current path in series to the respective switch 51, 52, 53 to limit the voltage $U_d$ across the respective OLED. The intrinsic capacitance of the OLEDs is thereby held at a defined charge level.

Figure 6:
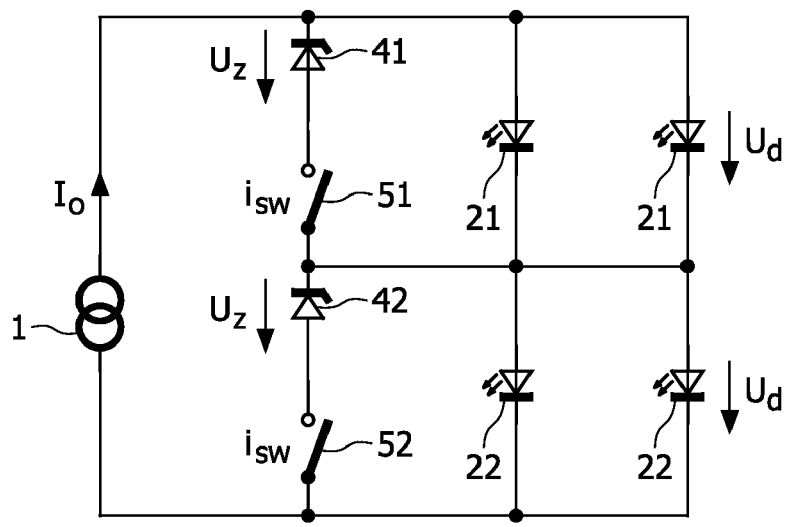
FIG. 6 shows a circuit diagram of a further example of a system for modulating a plurality of OLEDs and FIG. 7 shows a circuit diagram of another embodiment of a circuit-arrangement according to the invention

FIG. 6 shows another example of a system for modulating a plurality of OLEDs 21, 22. Here, two circuit-arrangements are connected in series, whereby each circuit-arrangement comprises a group of two parallel OLEDs 21, 22, for enhancing the brightness in each separately dimmable group. Because of the parallel connection of the OLEDs 21, 22 in each group, the combined capacitance is even higher, which renders the invention particularly efficient in this example.

Without any restriction, it is possible to arrange more than two OLEDs in each group. In this case, the parameters of the devices have to be adapted to the specific setup. In the example of FIG. 5, it is easily possible to arrange less or more than three circuit-arrangements in series. It is also possible, to combine the examples of FIGS. 5 and 6 and to arrange groups of parallel OLEDs in series to each other.

Figure 7:
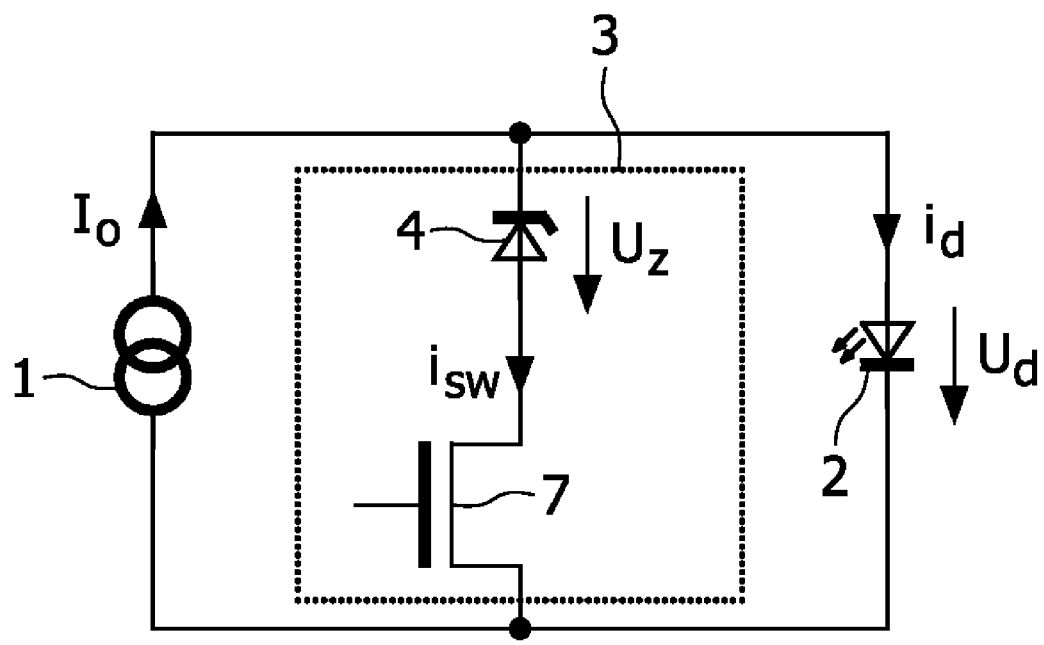

FIG. 7 shows a circuit-diagram of another embodiment of a circuit-arrangement according to the invention. The embodiment shown here is similar to the embodiment shown in FIG. 1, however, a semiconductor switching device, namely a MOSFET 7, is used as switching device. A control connection (not shown) to the gate terminal of the MOSFET 7 allows to easily control the dimming state of the OLED 2 by a modulation signal.

The embodiments described herein are intended in an illustrative rather than a limiting sense. The use of any reference signs in the claims shall not limit the scope of the respective claim.

The invention claimed is:

1. A circuit, comprising:
a current source;
a lighting device comprising at least one light emitting diode (LED); and
a modulation-circuit, wherein the modulation-circuit comprises a switching device in series with a threshold device,
wherein the current source, the lighting device, and the modulation circuit are all arranged in parallel with each other,
where the threshold device is conductive if a voltage, above a threshold voltage Uz is applied to it, and the threshold voltage Uz is chosen in dependence of a forward bias voltage Uf of the LED in a range $0.1*Uf \leq Uz \leq 1.5*Uf$.

2. The circuit of claim 1, where the threshold voltage Uz is $0.9*Uf \leq Uz \leq 1.2*Uf$, where Uf is the forward bias voltage of the LED.

3. A circuit, comprising:
a current source;
a lighting device comprising at least one light emitting diode (LED); and
a modulation-circuit, wherein the modulation-circuit comprises a switching device in series with a threshold device,
wherein the current source, the lighting device, and the modulation circuit are all arranged in parallel with each other,
wherein the threshold device is a zener diode, and wherein the modulation circuit consists of a series combination of the zener diode and the switching device, the series combination of the zener diode and the switching device being directly connected across terminals of the LED.

4. The circuit of claim 3, where the LED is an organic light-emitting device (OLED).

5. The circuit of claim 3, where the threshold device is a zener diode.

6. The circuit of claim 5, where the zener diode is arranged in a forward bias orientation in opposite direction to a forward bias orientation of the LED.

7. The circuit of claim 3, where a threshold voltage $Uz \leq Uf$, where Uf is a forward bias voltage of the LED.

8. The circuit of claim 3, where the switching device is a field effect transistor.

9. The circuit of claim 3, wherein the at least one LED comprises a plurality of LEDs arranged in series with each other.

10. The circuit of claim 3, wherein the at least one LED comprises a plurality of LEDs arranged in parallel with each other.

11. The circuit of claim 3, wherein the at least one LED comprises a plurality of LEDs, including a first LED for emitting red light, a second LED for emitting green light, and a third LED for emitting blue light.

12. An apparatus, comprising:
a lighting device comprising a plurality of light emitting diode (LED) groups arranged in series with each other, the lighting device being arranged in parallel with a current source; and
a plurality of modulation circuits, each modulation circuit being arranged in parallel with a corresponding one of the LED groups, wherein each modulation circuit comprises a corresponding switching device in series with a corresponding threshold element,
wherein the threshold device is a zener diode, and wherein each modulation circuit consists of a series combination of the zener diode and the switching device, the series combination of the zener diode and the switching device being directly connected across the corresponding LED group.

13. The apparatus of claim 12, wherein the lighting device comprises a plurality of LEDs, including a first LED for emitting red light, a second LED for emitting green light, and a third LED for emitting blue light.

14. The apparatus of claim 12, wherein at least one of the LED groups comprises a plurality of LEDs arranged in parallel with each other.

* * * * *